May 30, 1950 H. TOMOSER 2,509,656
VALVE
Filed Sept. 12, 1946
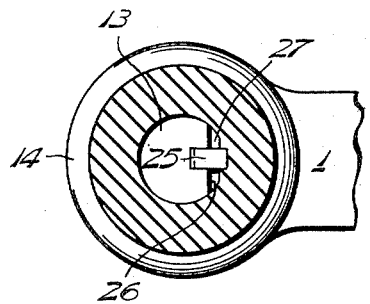
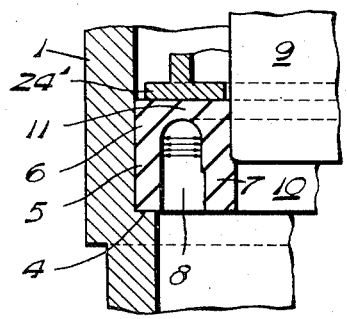
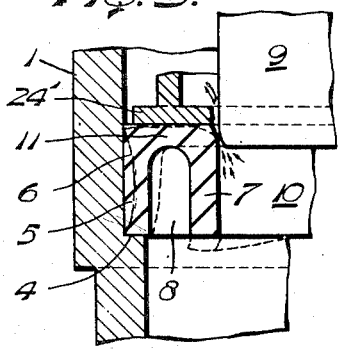
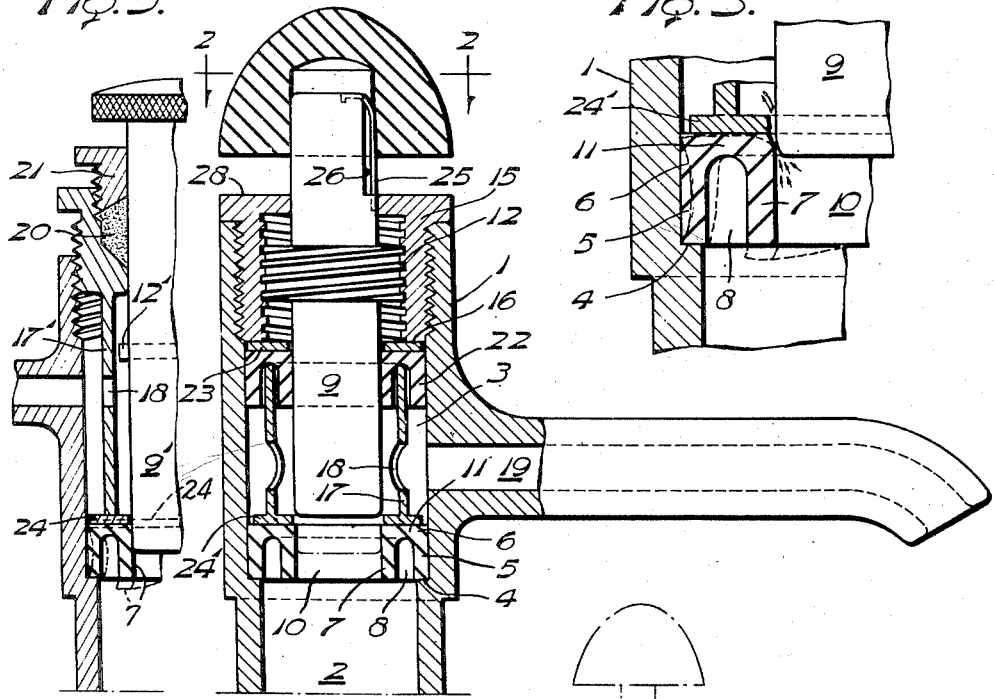
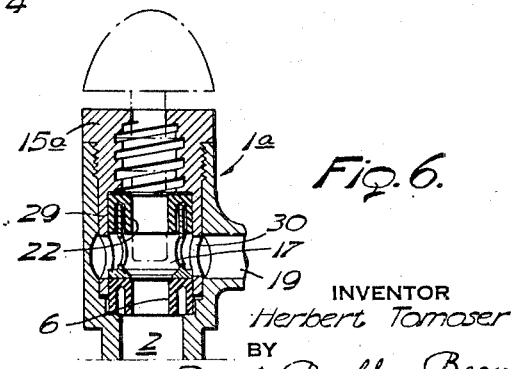
INVENTOR
Herbert Tomoser
BY
Beau, Brooks, Buckley & Beau.
ATTORNEYS Patented May 30, 1950

2,509,656

UNITED STATES PATENT OFFICE 2,509,656

VALVE

Herbert Tomoser, Kenmore, N. Y., assignor to Twentieth Century Valve Corporation, Inc., New York, N. Y., a corporation of New York Application September 12, 1946, Serial No. 696,505

9 Claims. (Cl. 251—75)

This invention relates to a valve or faucet, these terms being used interchangeably herein, for controlling and shutting off the flow of fluid. The faucet usually employed in the water system of the home has a seat against which a disk washer is brought to bear firmly by the turning of a screw threaded valve shank. Such action causes the disk washer to grind itself onto the seat as it rotates to a closed position, and consequently there is considerable wear which soon impairs the efficiency of the faucet.

An object of the present invention is to provide a valve in which the closing off of the liquid flow therethrough is responsive to the hydraulic pressure at the inlet side of the valving member.

Further, the invention contemplates a construction in which fresh surface portions are brought into use as wear may occur on portions heretofore utilized.

Again, the invention has for its object to provide a faucet or valve of practical and durable construction and one which may readily be assembled in an expeditious manner so as to previde a device of this character which is economical in production.

The invention further resides in a simplified valve structure in which any part or parts subject to wear may be replaced in a facile manner. The foregoing and other objects will manifest themselves as the following description progresses, with reference to the accompanying drawing, wherein:

Fig. 1 is a sectional view of a faucet or valve member of the present invention, parts thereof being left in elevation;

Fig. 2 is a transverse sectional view about on line 2—2 of Fig. 1;

Figs. 3 and 4 are schematic views illustrating progressive steps in the functioning of the valving member and its cooperating washer as the liquid flow is being closed off; and Figs. 5 and 6 are detailed sectional views depicting modified forms of faucet construction embodying the present invention.

Referring more particularly to the drawing, the numeral 1 designates the body of the valve which has an inlet opening 2 formed for attachment to a water pipe for delivering water under pressure thereto. The opposite end of the valve body is provided with a counterbore providing a chamber 3 and an internal shoulder 4. Seating on the shoulder is the outer flange 5 of a channeled ring shaped washer 6, the inner annular flange 7 of the washer being suspended inwardly from the chamber wall and extending toward the inlet opening so that the water under pressure may freely enter the washer channel 8. The valving member 9 comprises simply a cylindrical stem which is adjustably mounted in the counterbore for sliding movement into and out of the opening 10 of the annular washer with a sliding fit. The washer is preferably molded of rubber, or like elastic material, so that its inner flange 7 elastically embraces the valve member 9 in addition to the hydraulic assistance offered by the inlet fluid pressure after the valve moves a sufficient distance into the opening 10 of the washer. When molding the rubber washer it is customary to give the outer wall of the outer flange 5 a slight flare and the inner wall of the inner flange 7 a slight taper to facilitate the displacement of the washer from the mold. In other words, these flange walls diverge relative to each other toward their free edges, and as the free end of the valving member 9 moves into the inner flange the latter will snugly and conformably fit over the free end shoulder of the valve. This sealing fit will be insured by reason of the fluid pressure within the channel 8. Therefore, the washer constitutes a resilient valve seat which has a depending annular flange or sleeve that is responsive to the hydraulic or fluid pressure at the inlet side when the valve is in a closed position.

When the valve begins to move into the washer opening it will gradually shut off the flow of water, the rubber body of the washer yielding slightly under the pressure of the flowing liquid with a consequential, much retarded liquid flow through the opening. This is illustrated by the exaggerated showing of Fig. 3. However, as the stem-like valve continues its movement into the washer opening beyond the bottom wall 11 of the channel 8, the liquid pressure within the channel will act laterally in a radial direction to compress or contract the inner flange 7 of the washer into a tight liquid sealing embrace with the valve 9 and completely disrupt the flow of liquid through the faucet, as shown in Fig. 4. This valving action will occur when the valve has moved only partway into the resilient valve seat. Immediately upon the lower end of the valve moving beneath the plane of the bottom wall the fluid pressure will act centripetally upon the inner flange and cause the valve-surrounding portion of the flange to tightly hug the valving end of the stem. The valve will completely shut off the fluid flow indefinitely at this point until the wear and tear on such particular active portion of the inner flange render it ineffective, whereupon a slight further inward movement of the valve into the flange will present the valve to a new part of the flange for sealing contact under the urge of the hydraulic pressure. Consequently, the valve will gradually work itself down into the inner flange as the wear and tear progress. Preferably, the limit of this inward movement of the valve is determined short of the full length of the suspended inner flange. Even though the washer is designed for a close fit on the valve the advancing movement of the latter into the inner flange 7 is a free and easy one because of the lubricating characteristic of the water upon the rubber body of the washer.

The advancing movement of the valve may be accomplished by means of the external threads 12 formed upon the valve shank 13, the latter carrying a suitable handle such as is indicated at 14. The threads 12 are engaged with the cooperating internal threads on an annular nut 15 which in turn is threaded within the outer end of the chamber 3, the nut having an internal shoulder 16 for limiting the withdrawing movement of the valve when the latter is rotated. The valve mounting nut 15 is also utilized to secure the ring washer in position, and this is accomplished by means of a spacing sleeve 17 which is interposed between the washer and the nut 15. This spacer may be permanently carried by the nut, as indicated at 17' in Fig. 5, if desired, or it may be separately formed, as in Fig. 1. The spacing sleeve has one or more openings 18 through which the water may flow for discharge from the faucet outlet opening 19.

While a usual packing gland 20 and its compressing nut 21 may be employed for sealing the faucet about the valve 9', as shown in Fig. 5, it is preferred to employ a second channeled ring washer 22 beneath the valve mounting nut 15, Fig. 1, so that its inner and outer flanges may serve to seal off the chamber 3 against leakage along the shank 13. This sealing ring 22 is conveniently supported on the spacing sleeve 17 by having its inner and outer flanges straddling the upper end of the sleeve. A wear ring 23 of metal or the like may be interposed between the washer 22 and the nut 15 to avoid unnecessary wear on the rubber seal. Likewise a wear plate 24 may be interposed between the lower end of the spacing sleeve and the seat forming ring washer, Fig. 5. This wear plate 24 will constitute a backing for the valve seat member 6 to give sustaining support to both flanges 5 and 7. However, the inner marginal portion of the bottom wall 11, with its suspended flange or sleeve 7, will be free to yield or move away from the backing and against the opposing fluid pressure as the valve enters its seat. This wear plate may take the form of a base flange 24' integral with the spacing sleeve, as in Fig. 1. A stop pin 12' on the valve 9' prevents its accidental displacement.

As above stated, the water will serve to lubricate the movement of the valve into the opening 10, but the flow will be disrupted immediately upon the valve moving sufficiently far into the inner flange 7 to enable the water pressure acting centripetally upon the flange. By supporting the elastic seat 6 through its outer flange 5 resting upon the shoulder 4, the seat will be free to yield, such as is indicated in the broken lines in Figs. 3 and 5.

The handle or knob 14 is frictionally secured on the shank 13 by a flat spring 25 reacting against a flat face 26 on the shank and the wall of the shank receiving socket 27. This provides a connection by which the valve may be readily turned, and at the same time it permits an axial adjustment as the valve 9 recedes into the opening 10 following wear on the inner flange 7. By simply continuing the turning of the knob 14, the shank 13 will continue its axial movement while the knob merely seats and turns upon the upper surface 28 of the faucet body or nut or collar 15.

The construction is simple, its parts are economically and durably constructed and may be readily assembled, and the action of the valve is sure in that the water pressure effects the shutting off of the water flow with little, if any, friction attendant thereto. To further facilitate the assembly of the parts the nut 15a, Fig. 6, may have a sleeve extension 29 depending about the washers 6 and 22, and the interposed spacing sleeve, the inner diameter of the sleeve being such as to frictionally receive the two washers and thereby hold the parts in assembled order. To accommodate this sleeve 29 the faucet body 1a may be counterbored, as shown. This provides a replaceable cartridge for the faucet which will not only enable quick assembly but will also facilitate repair. The washer 6 will, as shown, project beyond the lower edge of the sleeve 29 so that its flanges may properly function to seal against fluid leakage. Obviously, the sleeve 29 will be provided with one or more egress openings 30 to permit the outflow of liquid from the faucet.

The foregoing description has been given in detail for clarity and without any thought of limitation since the inventive principles involved are capable of assuming other physical embodiments without departing from the spirit of the invention and the scope of the appended claims. For example, the valve and washer may be substantially circular in cross section such as polygonal or oval, the valve of course maintaining its sliding fit within the flange so that the hydraulic pressure is inward against the peripheral surface, such configuration being embraced in the terms "circular," "annular," and the like, used in the appended claims. Again, the valve may be used in air or gas lines to advantage and therefore the reference to water and liquid is made in a comprehensive sense.

What is claimed is:

1. A valve having a body formed with a chamber having inlet and outlet openings and a third opening arranged in opposition to the inlet opening, said inlet opening entering the chamber through an internal and substantially annular shoulder coaxial with the third opening, an annular elastic washer constituting a valve seat and having a channel in its forward side facing the inlet and defining inner and outer substantially concentric flanges, the outer flange only seating upon said shoulder and flexibly suspending the inner flange, a valve member arranged in the third opening and having a cylindrical part slidably and conformably fitting the inner flange and displaceable therefrom to permit fluid flow therethrough, the washer channel being in communication with the fluid pressure in the inlet opening whereby the respective flanges will be pressed outwardly and inwardly into sealing contact with the chamber wall and the cylindrical part of the valve, a channeled washer encircling the valve and sealing the third opening against leakage from the chamber, the channel of the second washer facing in the same direction as that of the seat-forming washer, a sustaining spacer interposed between the two washers to hold them in operative position, said spacer having one end engaged in the channel of the second washer and centralized thereby to have its opposite end serve as a backing for the seat-forming washer, and means removably supporting the valve member in the third opening and acting additionally to secure the two washers and the sustaining spacer in position.

2. A valve having a body formed with a chamber having inlet and outlet openings and a third opening arranged in opposition to the inlet opening, said inlet opening entering the chamber through an internal and substantially annular shoulder coaxial with the third opening, an annular elastic washer having a channel in its forward side face defining inner and outer substantially concentric flanges, the outer flange seating upon said shoulder, a valve member arranged in the third opening and having a part slidably and conformably fitting the inner flange and displaceable therefrom to permit fluid flow therethrough, the washer channel being in communication with the fluid pressure in the inlet opening whereby the respective flanges will be pressed outwardly and inwardly into sealing contact with the chamber wall and the part of the valve member, a channeled washer encircling the valve member and sealing the third opening against leakage from the chamber, a sustaining spacer interposed between the two washers to hold them operative, and means removably supporting the valve member in the third opening and acting additionally to secure the two washers and the sustaining spacer in position, said supporting means having a sleeve extension operatively supporting the two washers and the sustaining spacer for mounting and demounting as a unit with respect to the valve body.

3. A valve having a body with an inlet and an outlet with an internal stop shoulder therebetween and an opening giving access to the shoulder, a substantially annular elastic seat formed in its upstream face with an annular channel to provide inner and outer concentric flanges with the channel being opened to the inlet pressure and with the outer flange providing yielding support for the seat from the shoulder, a valve member arranged for conformably and slidably fitting the passage through the inner flange and withdrawable to open the passage for fluid flow therethrough, an annular washer arranged in the body opening and through which the valve member slides, said washer having a channel thereabout opening in the same direction as the first channel, the outlet leading from between the seat and the washer, a spacer between the seat and the washer engaging at one end in the channel of the washer thereby to position its opposite end upon the back of the seat, said opposite end having a relative broader contact with the back of the seat to support the latter when the valve member is being withdrawn, and means acting through the washer and the spacer to hold the seat operatively related to the stem and to the shoulder.

4. A valve having a body with an inlet and an outlet with an internal stop shoulder therebetween and an opening giving access to the shoulder, a substantially annular elastic seat supported by said shoulder and formed in its forward face with an annular channel which defines inner and outer concentric flanges with the channel facing the inlet for receiving fluid under pressure therefrom, a valve member arranged rearwardly of the seat and conformably and slidably fitting the passage through the inner flange, an annular washer arranged in the body opening and through which the valve member slides, said washer having a channel thereabout opening in the same direction as the first channel, the outlet leading from between the seat and the washer, a spacer between the seat and the washer engaging at one end in the channel of the washer thereby to position its opposite end upon the back of the seat, and a valve mounting member mounted on the body to give backing support to the washer and to receive the axial thrust of the inlet fluid pressure as transmitted thereto through the seat and the spacer for holding the several parts operatively related to the valve member and to the shoulder, said valve member having threaded engagement with the mounting member.

5. A valve having a body formed with a chamber having an inlet and an outlet and an opening arranged in opposition to the inlet which latter enters the chamber through an internal shoulder, an annular elastic seat insertable through the body opening and having a channel in its forward face defining inner and outer substantially concentric flanges, means operatively supporting the elastic seat with its inner flange overhanging the shoulder in a manner to admit inlet pressure to the channel, and a valve member adjustably arranged in the body opening at the rear of the seat and having a part slidably and conformably fitting the inner flange and displaceable therefrom to permit fluid flow therethrough, the seat channel being in communication with the fluid pressure with its flanges being acted upon thereby outwardly and inwardly into sealing contact with the chamber wall and the part of the valve member, and said supporting means incorporating retainer means arranged in the body opening and including a spacer member enclosing the valve part and provided with a radial passage through which fluid may pass to the outlet, said spacer resting upon the back face of and constituting a backing for the elastic seat.

6. A valve according to claim 3, wherein the valve mounting member is provided with a sleeve extension into the body, the inner end of the sleeve extension receiving and serving to support the elastic seat in position on said shoulder, the outer flange of the washer protruding from the inner end of the sleeve extension for freedom to seat on the shoulder in sealing contact therewith.

7. A valve according to claim 3, wherein the valve member has threaded engagement with the body and is provided with a shank extending through the body opening, and a handle has rotary bearing engagement upon the body and is slidably keyed to the shank for turning the latter while permitting such sliding movement of the valve and still maintaining such bearing engagement upon the body.

8. A valve according to claim 3, wherein a wear ring is interposed between said opposite end of the spacer and the back of the seat for providing such relative broader contact therewith.

9. A valve according to claim 3, wherein means are provided for limiting the inward movement of the valve member into the elastic seat short of the full extent of the inner flange, whereby the inner flange will overlie the active side face portion of the valve member and protect it from seat-scoring deposit from the inlet fluid when the valve is closed.

HERBERT TOMOSER.

REFERENCES CITED

The following references are of record in the file of this patent:

UNITED STATES PATENTS

| Number | Name | Date |
|---|---|---|
| 549,419 | Wright | Nov. 5, 1895 |
| 1,320,944 | Thoens | Nov. 4, 1919 |
| 2,087,185 | Dillon | July 13, 1937 |
| 2,132,030 | Hunt | Oct. 4, 1938 |
| 2,217,880 | Woodson | Oct. 15, 1940 |
| 2,344,657 | Thiel | Mar. 21, 1944 |
| 2,394,345 | Werner | Feb. 5, 1946 |
| 2,415,417 | Collins | Feb. 11, 1947 |

FOREIGN PATENTS

| Number | Country | Date |
|---|---|---|
| 1,570 | Great Britain | of 1861 |
| 293,730 | Great Britain | of 1928 |
| 439,591 | Great Britain | of 1935 |

Certificate of Correction

Patent No. 2,509,656 May 30, 1950

HERBERT TOMOSER

It is hereby certified that errors appear in the printed specification of the above numbered patent requiring correction as follows:

Column 5, lines 54 and 55, strike out the words "rearwardly of the seat and" and insert instead *for*; line 56, after "flange" and before the comma insert *and withdrawable to open the passage for fluid flow therethrough*;

and that the said Letters Patent should be read with these corrections therein that the same may conform to the record of the case in the Patent Office.

Signed and sealed this 22nd day of August, A. D. 1950.

[SEAL]

THOMAS F. MURPHY,
*Assistant Commissioner of Patents.*